UNITED STATES PATENT OFFICE.

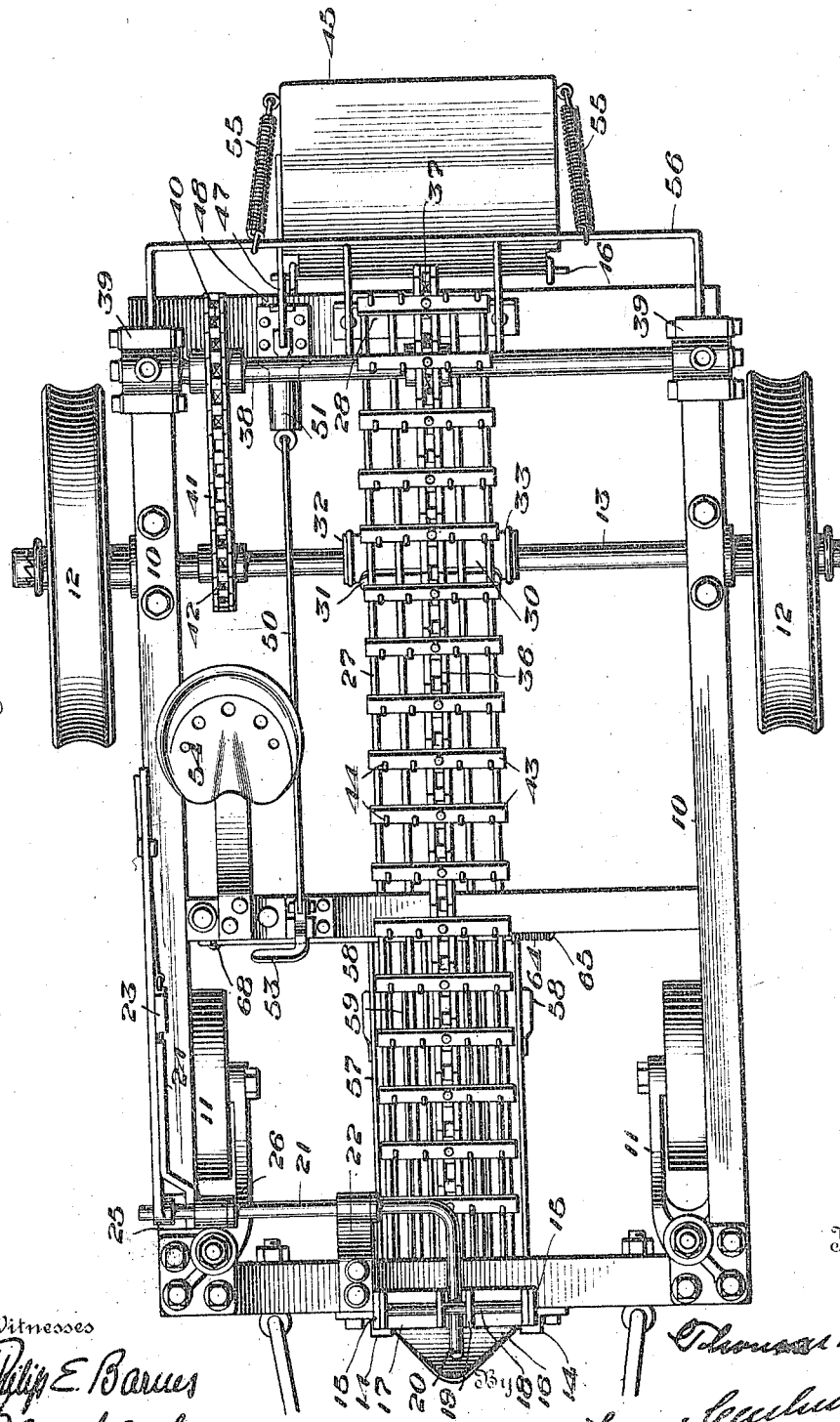

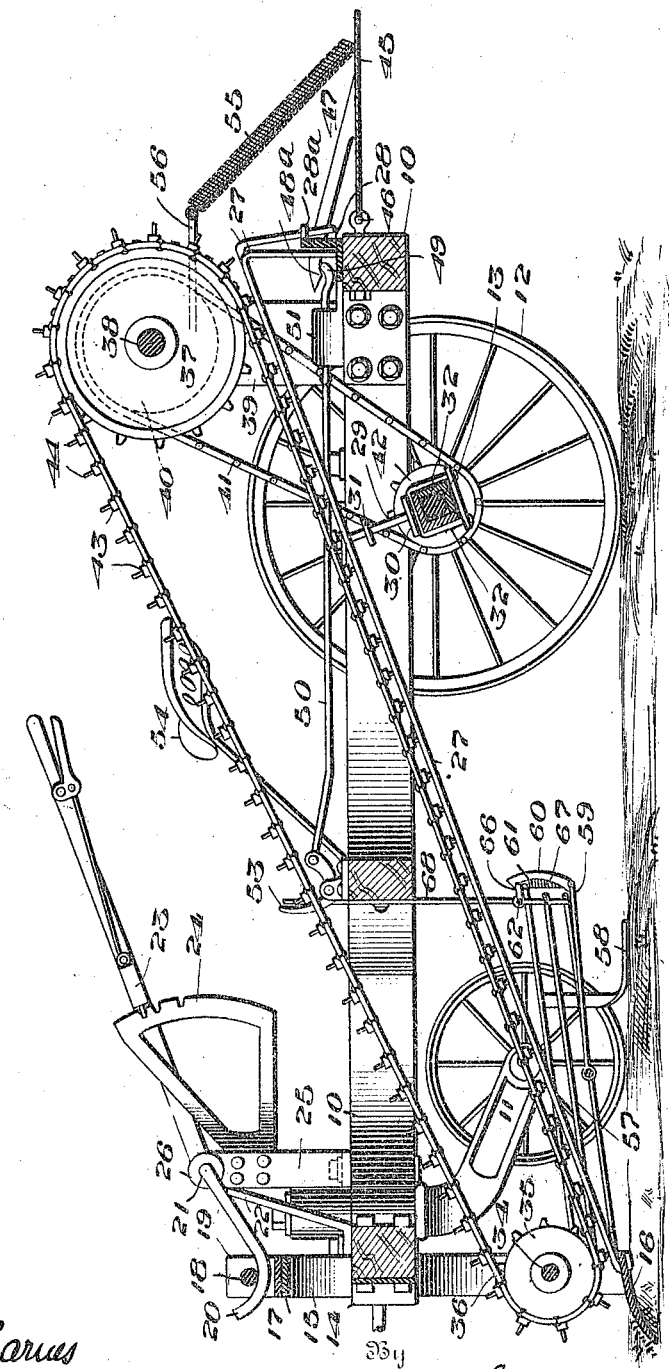

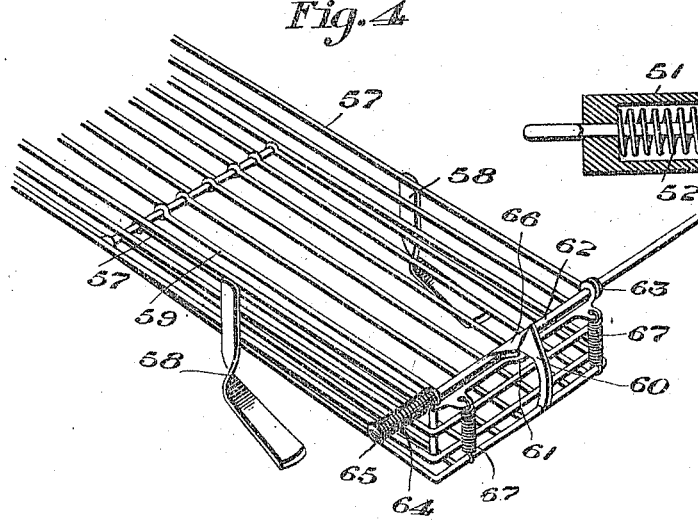
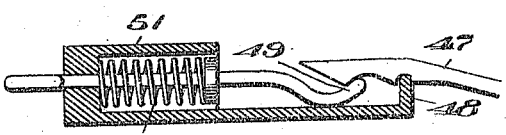
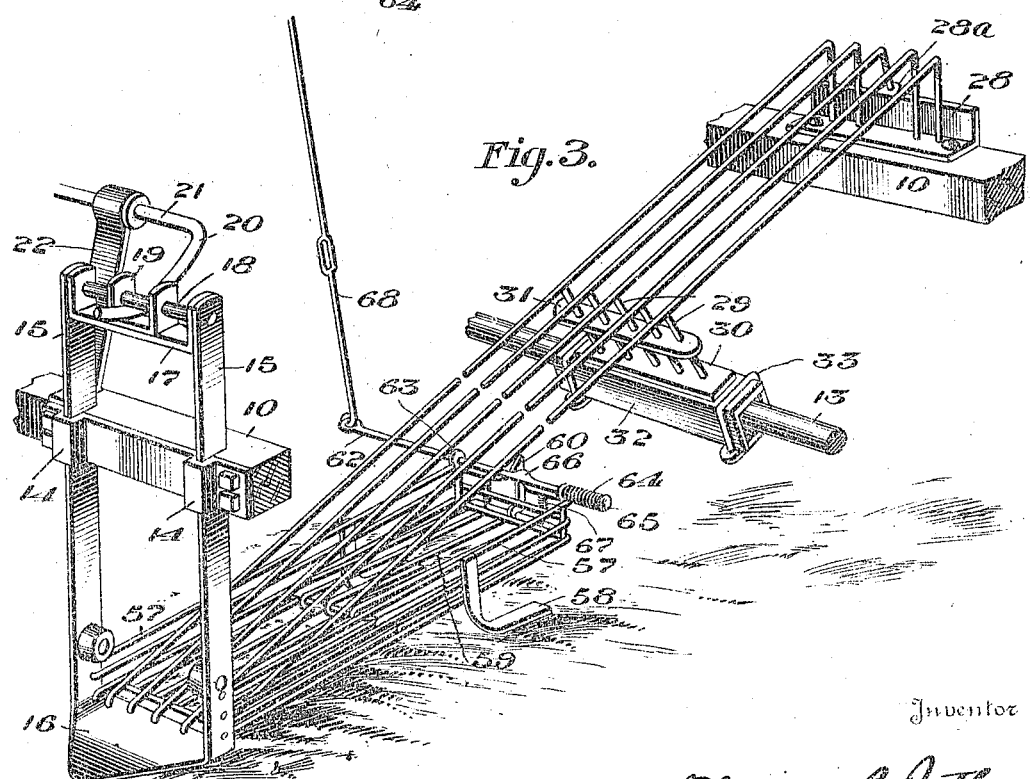

THOMAS B. PRETLOW, OF APPOMATTOX, VIRGINIA.

PEANUT-HARVESTER.

1,233,805.  Specification of Letters Patent.  Patented July 17, 1917.

Application filed September 21, 1915. Serial No. 51,857.

*To all whom it may concern:*

Be it known that I, THOMAS B. PRETLOW, a citizen of the United States, residing at Appomattox, in the county of Appomattox and State of Virginia, have invented new and useful Improvements in Peanut-Harvesters, of which the following is a specification.

This invention relates to harvesters, and has more particular reference to that type of harvester for gathering peanuts.

In machines of this character heretofore invented and manufactured great difficulty has been experienced in offsetting considerable waste of the product and in properly selecting and handling the peanuts.

It is an object of this invention to provide a harvester which is so constructed that it will lift all of the peanuts and vines from the ground, will remove the dirt and other accumulations thereon, will deposit the peanuts and the attached vines in a suitable receptacle for dumping at predetermined times, and will separate and collect together the small peanuts which have become detached from the vines and which cannot be subsequently treated properly so as to leave the field perfectly clear of the peanuts and vines and in condition to be further sowed or worked without the necessity of employing independent means for clearing the field.

The invention also aims at a structure of harvester of this nature which comprises relatively few parts, has but light draft, and a machine which may be entirely controlled by one attendant.

A particular object of the invention is to provide a peanut harvester with a peanut lifting mechanism which is of such construction and is so arranged as to insure the passage of all of the peanuts and vines into the machine and to admit of the positioning of the lifting plow or point in the ground at the required depth.

Other objects and advantages of this invention will be more fully brought out in the following detail disclosure of the present embodiment thereof, the same being shown in the accompanying drawings wherein,—

Figure 1 is a top plan view of the improved harvester.

Fig. 2 is a longitudinal section taken through the same.

Fig. 3 is a detail perspective view of the open rack and its adjacent parts.

Fig. 4 is a detail perspective view of the basket used beneath the forward end of the harvester.

Fig. 5 is a detailed perspective view of the latch and tripping means therefor used in connection with the rear receiver of the machine.

As disclosed in the drawings, the present embodiment of this invention comprises a frame 10 of any adaptable form supported at its forward end upon caster wheels 11 and at its rear end upon traction wheels 12, the latter being mounted upon the opposite ends of an axle 13 suitably journaled in the frame adjacent the rear end thereof. The forward end of the frame is provided with a pair of guides 14 through which pass vertical arms 15 rising from the opposite sides of a plow point 16. The point 16 is preferably broadened and flattened at its rear end and extends downwardly and forwardly to substantially a point for engagement in the ground at the desired depth. The arms 15 are free for vertical movement in the guides 14 and are joined at their upper ends by a cross bar 17 having flanged ends bearing against the inner sides of the arms 15 and through which passes a transverse rod 18. The rod 18 is spaced above the cross bar 17 and supports a U-shaped guide 19 for the reception of a curved finger 20 adapted to pass through the guide 19 beneath the rod 18. The finger 20 is mounted upon the shaft 21 suitably journaled in a strap bearing 22 rising from the frame 10 said shaft extending laterally of the bearing to a suitable point where it is provided with a hand lever 23. The hand lever 23 traverses a segment 24 fixed to a post 25 rising from the frame 10 so as to secure the shaft 21 in various positions of rotative adjustment. The rotation of the shaft 21 thus raises and lowers the plow frame to adjust the depth of the plow in the ground. The outer end of the shaft 21 is journaled in a bearing 26 on the upper end of the post 25 to provide for a rigid structure.

Gradually rising from the rear end of the plow 16 is a rack 27, the same comprising a plurality of spaced apart rods or bars hinged at their forward ends to the plow 16, and extending rearwardly upward through the frame 10 where their rear ends are turned down for engagement against an angle plate 28 fixed to the frame, as shown to advantage in Fig. 3. The angle plate is provided at its upper edge with a preferably rearwardly extending lug 28ª through which passes the down turned end of one of the bars of the rack, whereby to guide the rack in its vertical movement and prevent the lateral displacement of the same. Intermediate the ends of the rack 27 and adjacent to the axle 13 each rod or bar is provided with a depending pin 29 terminating in an abutment 30, the latter being in the form of a flat bar of substantial width and preferably extending throughout the entire width of the rack 27. The pins 29 are reinforced by a plate 31 through which each of the pins 29 passes for the purpose of holding the pins 29 in parallelism and from spreading. The reinforcing plate 31 is spaced downwardly beneath the rack 27 to provide for a substantial clearance between the upper face of the rack and the plate 31 for a purpose which hereinafter appear. The axle 13 is provided with a cam 32 immediately beneath the abutment 30 for the purpose of knocking or raising the abutment 30 to vibrate the rack 27. As shown in the present instance, this cam is preferably made up of a pair of angle bars having their longitudinal edges abutting and placed about the intermediate portion of the shaft beneath the abutment 30. The cam is clamped or secured in place upon the shaft by clamps 33 located upon the ends of the cam and adapted to bind the angle plates against the shaft.

Journaled between the arms 15 of the plow frame and adjacent to the lower ends thereof is a transverse shaft 34 upon the middle portion of which is mounted a sprocket wheel 35 over which passes an endless belt 36. At the rear end of the frame 10 the belt 36 passes over a relatively large sprocket wheel 37 fixed to a transverse shaft 38 journaled at its ends in posts 39 rising from the rear end of the frame. For operating the endless belt 36, the shaft 38 is also provided with a sprocket wheel 40 connected by a chain 41 to a sprocket 42 upon the axle 13. The belt 36 is provided with a plurality of transverse slats 43 secured to the outer face of the belt and having outstanding tines or pins 44 which preferably register with the spaces between the bars of the rack 27 and which upon the operation of the belt travel immediately over the rack lengthwise thereof and toward the rear of the same.

The rear end of the frame 10 is provided with a receiver into which are thrown the vines and peanuts as they are delivered from the rear end of the rack. This receiver 45 is in the form of a receptacle hinged to the cross bar of the frame 10, as at 46, and normally held in upright position by a latch 47 suitably shouldered to engage a keeper 48, the latter being carried on the frame. The latch 47 is provided with a cam 48ª upon its outer end to receive the toe 49 of a releasing rod 50, the latter moving through a bearing box 51, in which is placed a spring 52 adapted to normally hold the rod 50 in retracted position and to admit of the normal locking engagement of the latch 47 with the keeper. A foot lever 53 is connected to the forward end of the releasing rod 50 and is located adjacent to the operator's seat 54. Thus operation of the lever 53 moves the rod 50 forward to cause the toe 49 to ride against the cam 48ª and raise the latch 47 from the keeper. The contents of the receiver causes the same to swing downwardly and permits the contents to fall upon the ground. Relatively light springs 55 are secured at one end of the receiver 45 and at their opposite ends to a bail 56 extending rearwardly from the posts 39 at a point above the receiver. The springs 55 are adapted to turn the receiver to normally raised position and to bring the latch into locking engagement with the keeper.

The forward end of the harvester is provided with a basket 57 formed preferably of rods or bars and which is secured at its forward end to the rear edge of the plow 16 beneath the rack 27. Shoes 58 depend from the sides of the basket 57 adjacent the rear end thereof to support the rear end of the basket a slight distance above the ground. The basket is provided with a gate 59 in its bottom at the rear end thereof, the gate being hinged at its forward edge to the bottom and being supported at its rear end by a spring latch 60 which engages a lip 61 projecting from the upper edge of the rear wall of the basket. A rod 62 is slidably mounted across the rear end of the basket at the top thereof, is provided with a stop collar 63 upon one end thereof, and has a spring 64 upon its opposite end. The spring is confined between the side of the basket and a head 65 formed on the outer end of the rod. The spring thus holds the rod in position to engage the stop collar 63 against the opposite side of the basket. A cam 66 is carried by the rod 62 in the path of the latch 60 and is adapted to release the same from the lip 61 upon the transverse movement of the rod 63 to permit the gate 59 to fall and dump the contents of the basket upon the ground. Springs 67 connect the rear end of the gate 59 with the body of the basket and are adapted to return the gate to normally closed position as soon as the contents are delivered on the ground. The rod 62 is moved transversely by means of a lever 68 suitably hinged to the frame adjacent to the operator's seat, whereby the contents of the basket may be deposited on the ground when desired.

In operation, the machine is drawn forwardly to cause the traction wheels 12 to rotate. The axle 13 is thus turned and through the sprockets 42 and 40 and the belt 41 drives the shaft 38 to thus set the endless belt or feeder into operation and cause the tines 44 to move backwardly in slightly spaced relation above the rack 27. The handle 23 is adjusted to lower the plow frame and project the plow point 16 into the ground. The vines and peanuts are raised over the plow point 16 upon the rack 27 and the tines 44 of the endless belt or feeder engage in the vines and carry the same upwardly over the rack 27. The axle 13 turns the cam 32 and owing to the angled faces of the cam knocks or vibrates the abutment 30 and thus vibrates or shakes the rear end of the rack. This motion of the rack separates dirt and other foreign substances from the vines and peanuts during their passage upwardly over the rack. The tines 44 engage in the vines and permit the peanuts to hang down through the spaces between the bars of the rack. The peanuts which become separated from the vines fall through the rack into the forward basket or receiver 59 and after the desired accumulation therein are deposited on the ground in the manner above set forth.

The feeder or endless belt carries the vines with the peanuts hanging therefrom through the frame and past the fingers 29, the brace plate 31 being spaced downwardly from the rack to admit of the uninterrupted passage of the peanuts to the rear of the frame without contact with any part of the machine which would break the peanuts from the vines. The vines and the peanuts are delivered from the rear end of the rack 27 onto the receiver 45 at the rear of the machine. When the desired accumulation of vines and peanuts has been placed upon this rear receiver the operator actuates the lever 53 to drop the receiver and deposit the vines and peanuts on the ground as has been above described.

It is thus seen that with the machine of this invention all of the peanuts and vines are raised from the ground and deposited on the rack. The peanuts which become severed from the vines, and which cannot be subsequently treated, are dropped into forward basket while the vines and peanuts adhering thereto are carried on through the machine and deposited in separate stacks upon the ground. Thus the machine entirely frees the field from the vines and the peanuts, and it is not necessary to later gather up the small and detached peanuts which prevent the further sowing or working of the ground.

I claim:

1. In a peanut harvester, a plow, a rack rising rearwardly from the plow, means for vibrating the rack, a feeder adapted to engage the vines and peanuts as they are delivered from the plow and carry the vines and peanuts rearwardly of the rack, a basket beneath the forward end of the rack adapted to receive peanuts detached from the vines, and a receiver at the rear end of the harvester upon which the vines and peanuts are deposited from the rack.

2. In a peanut harvester, a rack comprising a plurality of spaced apart bars, means for depositing peanuts and vines upon said rack, a feeder engaging the peanuts and vines adapted to convey the same to one end of the rack, means for vibrating the rack to separate foreign substances from the vines and peanuts, means for receiving peanuts detached from the vines, and other means for receiving the vines and peanuts at the end of the rack.

3. In a peanut harvester, a frame, an open rack mounted in the frame, a plow carried upon the forward end of the rack, a basket beneath the rack at the forward end of the frame, a receiver at the rear end of the frame beneath the rack, a feeder for raising vines and peanuts from the plow to the rack, and a vibrator engaging the rack to free the vines and peanuts from dirt and to remove the loose peanuts from the rack into said basket, said feeder being adapted to carry the vines and peanuts attached thereto to the receiver at the rear of the frame.

4. In a peanut harvester, a frame, a rack in the frame, a plow point connected to the rack for raising peanuts and vines thereto, a feeder overhanging the rack and the plow for carrying peanuts and vines along the rack to the rear of the frame, a receptacle beneath the rear end of the rack for the reception of said peanuts and vines, means for vibrating the rack to free loose peanuts therefrom, and a basket beneath the rack for the reception of the loose peanuts.

5. A peanut harvester comprising a main frame, a plow frame mounted for vertical movement in the main frame, a hand lever for adjusting said plow frame in the main frame, a rack secured at its forward end to the plow frame for adjustment therewith, a feeder overhanging the rack and secured at its forward end to the plow frame for adjustment therewith, and independent receptacles beneath the forward and rear ends of the rack for receiving the separated material carried along the rack by said feeder.

6. A peanut harvester comprising a plow, a rack rising rearwardly from the plow and having longitudinal slots therein, a feeding belt above the rack, tines in said belt, vibrating means for the rack, and a receiver at the front end of the rack to catch peanuts that fall from the vines.

7. In a peanut harvester, a frame, a plow in the frame, a rack rising from the plow, a feeder overhanging the rack adapted to carry vines and peanuts from the plow to the rear end of the rack, means for vibrating the rack and independent receivers beneath the forward and rear ends of the rack for the reception of the separated material on the rack.

8. In a peanut harvester, a frame, a plow in the frame, a rack in the frame, independent receptacles beneath the forward and rear ends of the rack, means for conveying material raised by the plow along the rack, and means for vibrating the rack whereby to separate the material thereon for deposit in the independent receptacles.

9. In a peanut harvester, a rack comprising a plurality of spaced-apart bars, means for depositing peanuts and vines upon said rack, means for conveying the peanuts and vines to one end of said rack, and means at the forward end of said rack for receiving the peanuts detached from the vines.

10. In a machine of the class described, a frame, a plow vertically movable in said frame, a rack pivotally mounted at its forward end upon said plow, and a basket pivotally mounted at its forward end upon said plow.

11. In a machine of the class described, a frame, a plow, a vibratory rack comprising a plurality of spaced-apart rods hinged at their forward ends to the plow and having their rear ends turned downwardly, an angle plate upon the frame adapted to receive said down-turned ends of the rods, and an apertured lug on the angle plate adapted to receive one of the down-turned ends of said rods.

12. In a machine of the class described, a rotatable shaft, a rack comprising a plurality of spaced-apart rods, a pin extending downwardly from each of said rods, a flat bar to which the lower ends of said pins are connected, a reinforcing and spacing plate through which the pins pass, and a cam on said rotatable shaft adapted to engage the flat bar to vibrate the rack.

13. In a machine of the class described, the combination with a rack, of a shaft beneath said rack, a cam on the shaft comprising a pair of angle bars having their longitudinal edges abutting, clamps for securing said bars in place about the shaft, and means between the cam and the rack for vibrating the latter when said shaft is rotated.

14. In a machine of the class described, a rack, and a basket beneath said rack adapted to receive peanuts and the like detached from the vines upon the rack and comprising a receptacle having a gate in its bottom portion.

In testimony whereof I have hereunto set my hand in presence of two subscribing witnesses.

THOMAS B. PRETLOW.

Witnesses:
GERTRUDE M. STUCKER,
J. J. MAWHINNEY.

Copies of this patent may be obtained for five cents each, by addressing the "Commissioner of Patents, Washington, D. C."